United States Patent [19]
Cole

[11] Patent Number: 5,766,560
[45] Date of Patent: Jun. 16, 1998

[54] OZONE GENERATOR

[75] Inventor: William Lesley Cole, Camberley, Great Britain

[73] Assignee: Ozone Industries Limited, Farnborough, Great Britain

[21] Appl. No.: 791,501

[22] Filed: Jan. 27, 1997

[30] Foreign Application Priority Data

Feb. 2, 1996 [GB] United Kingdom ............ 9602180

[51] Int. Cl.[6] .................................. B01J 19/12
[52] U.S. Cl. .................. 422/186.18; 422/186.07; 422/907
[58] Field of Search ............ 422/186.07, 186.18, 422/186.19, 907; 204/176

[56] References Cited

U.S. PATENT DOCUMENTS

| | | | |
|---|---|---|---|
| 743,431 | 11/1903 | Blackmarr et al. | 422/186.07 |
| 1,136,227 | 4/1915 | Goldberg | 422/186.07 |
| 1,157,859 | 10/1915 | Freet | 422/186.07 |
| 1,326,631 | 12/1919 | Bayeux et al. | 422/186.07 |
| 1,505,669 | 8/1924 | Quain | 422/186.07 |
| 1,577,747 | 3/1926 | Hartman | 422/186.07 |
| 1,793,799 | 2/1931 | Hartman | 422/186.07 |
| 2,822,327 | 2/1958 | Hammesfahr et al. | 204/176 |
| 3,081,215 | 3/1963 | Held et al. | 156/286 |
| 3,337,784 | 8/1967 | Lueder | 317/262 |
| 4,410,495 | 10/1983 | Bassler et al. | 422/186.18 |
| 4,892,713 | 1/1990 | Newman | 422/186.07 |
| 5,272,414 | 12/1993 | Iwanaga | 313/631 |
| 5,354,541 | 10/1994 | Sali et al. | 422/186.07 |
| 5,364,600 | 11/1994 | Stiehl | 422/186.07 |
| 5,385,761 | 1/1995 | Iwanaga | 427/448 |
| 5,437,843 | 8/1995 | Kuan | 422/186.07 |
| 5,516,493 | 5/1996 | Bell et al. | 422/186.07 |
| 5,545,379 | 8/1996 | Gray | 422/186.04 |
| 5,545,380 | 8/1996 | Gray | 422/186.07 |

FOREIGN PATENT DOCUMENTS

| | | |
|---|---|---|
| 04 14 9005 | 5/1992 | Japan . |
| 07 30 9606 | 11/1995 | Japan . |
| 372 947 | 5/1932 | United Kingdom . |

OTHER PUBLICATIONS

WPI Abstract Accession No.93–245853/31 & JP5166578A (NGK) Jul. 2, 1993 (1 page).
WIP Abstract Accession No.91–106950/15 & JP3050103A (Ohashi) Mar. 4, 1991.
WIP Abstract Accession No.88–349621/49 & JP63260802A (Koyo) Oct. 27, 1988.
WIP Abstract Accession No.88–068924/10A (Suzuki) Feb. 2, 1988.

*Primary Examiner*—Daniel J. Jenkins
*Attorney, Agent, or Firm*—Herbert Dubno

[57] ABSTRACT

An ozone generator having a first electrode, a second electrode and leads for coupling a high-tension voltage between the two electrodes, the first electrode being operable to produce a corona discharge in its vicinity when the high-tension voltage is applied across the electrodes to form ozone from oxygen when present in the vicinity of the first electrode. The first electrode can be a straight wire arranged on a tile-shaped ceramic element. The second electrode can be formed by a metallic coating on the opposite side of the ceramic element and may be coated with a resin coating such as silicone rubber.

8 Claims, 7 Drawing Sheets

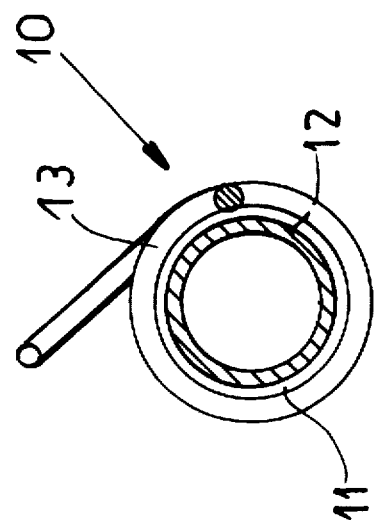
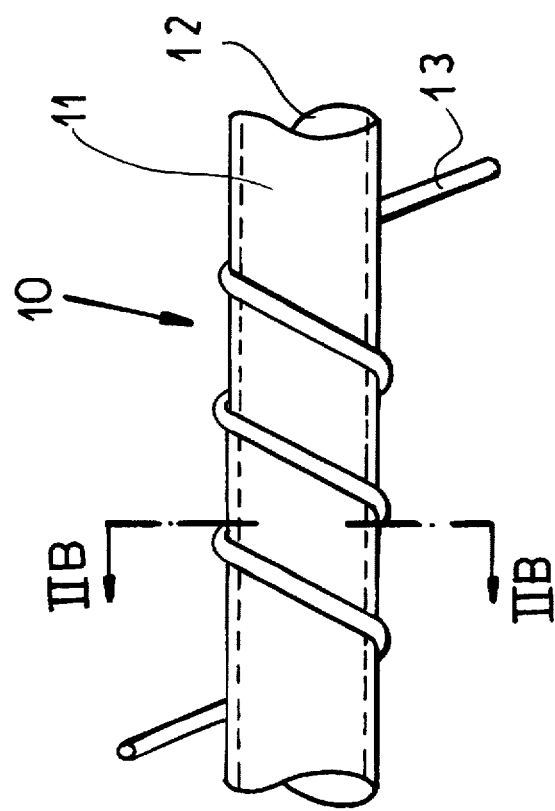
FIG. 2B
FIG. 2A

OZONE GENERATOR

FIELD OF THE INVENTION

This invention relates to a device for the production of ozone.

BACKGROUND OF THE INVENTION

Ozone, also referred to as "activated oxygen", is an allotropic form of oxygen, and is the fourth strongest oxidant. It has the formula $O_3$, and is formed by the action of ultra-violet light on oxygen. Ozone can be produced by silent electrical discharge, by connecting a high-voltage, high-frequency supply across two electrodes and passing an oxygen-containing gas, for example, air, between the electrodes. As the air passes between the electrodes, some of the oxygen molecules are excited to produce ozone molecules. This is represented by:

$$3O_2 = 2O_3$$

The reaction is endothermic.

The production of ozone using silent electrical discharge has been known for well over 100 years. A common form of ozone generator is the Siemens generator, which is described in "Comparative Inorganic Chemistry" by B. Moody, page 207, developed in 1858.

Ozone is an effective disinfecting and deodorizing agent. Ozone is capable of killing bacteria by breaking up their molecular structure. Thus, where unpleasant or harmful smells are caused by noxious airborne chemicals and by surface bacteria, the ozone kills the bacteria and breaks down the molecular structures of the chemicals, thus disinfecting and deodorizing. Even at a low level of 0.1 part per million, ozone is an effective bactericide. Because ozone is unstable, the ozone decomposes to oxygen leaving no residues to further eliminate. Ozone can also be used to sterilize water by the dissolution of ozone in it.

Because of these properties, the process of ozonizing i.e. treating with ozone, has many applications, for example, in the sterilizing of work surfaces in kitchens, for disinfecting and deodorizing public conveniences, and, when dissolved, for sterilizing swimming pools instead of chlorine.

Commercial devices for producing ozone, typically for disinfecting and deodorizing are well known.

A typical known ozonizer—as such devices are commonly referred to—is illustrated schematically in FIG. 1.

A generating cell 1 comprises a glass tube 2 provided with an inner aluminium coating 3 concentrically mounted within a stainless steel tube 4. Spacers (not shown) are used to ensure a uniform gap between the glass tube 2, and the stainless steel tube 4. The aluminium coating 3 is coupled to a high voltage supply via contact brushes 5 and a connector 6, and the stainless steel tube 4 is coupled to ground. The stainless steel tube 4 forms a first electrode, the aluminium coating forming a second electrode, the two being separated by a dielectric, the glass, and an air gap 7. An oxygen-containing gas is passed along the gap, and the high voltage is applied across the electrodes, thus producing some ozone molecules from the oxygen molecules in the gas by silent electric discharge. Because of the heat produced by the electric discharge, the generating cell 1 is surrounded by a water-cooled jacket 8. In a commercial ozonizer, many such generating cells are used to provide sufficient quantities of ozone.

Unfortunately, these generating cells are prone to glass failure—a 50% tube failure in a six-month period is not unknown.

Another known ozonizer uses a generating cell comprising a glass or ceramic tube with an inner silver mirror coating and outer stainless steel mesh.

These generating cells are prone to overheating, which can be aggravated by the mirror coatings, and electrically break down at small isolated points. This is further aggravated by the presence of glass impurities and a non-uniform electric field due to the undulating form of the stainless steel mesh.

The mirrored coating is applied using reduction of silver ions from solution. This coating has poor adhesion to the substrate, and is likely to wear off over time.

Ceramics have been used as a dielectric, but where ceramics are used, the dimensions of the air gap become extremely critical to provide efficient and satisfactory ozone production because the silent electric discharge will only result on one side of the tube only. It extremely difficult to manufacture ceramics to the tolerances required.

Generating cells comprising ceramic plates with electrode coatings have been used, but, in these cases, the coatings evaporate or sputter during use.

SUMMARY OF THE INVENTION

According to the present invention, there is provided ozone generating means comprising a first electrode, a second electrode and means for coupling a high-tension voltage between the two electrodes, the first electrode being operable to produce a corona discharge in its vicinity when the high-tension voltage is applied across the electrodes to form ozone molecules from oxygen molecules when present in the vicinity of the first electrode. The first electrode may be arranged as a straight piece of wire. Preferably the ceramic element is formed as a ceramic tile. This ozone generating means has the advantage of being cheap and easy to manufacture, and is modular in concept.

Because ceramic is a much harder material than glass, the ozone generating means is therefore less prone to damage and, therefore, longer lasting.

The second electrode may be a metallic coating on the inside of the ceramic tube or on the other surface of the ceramic tile. Because the inner coating is well adhered to the ceramic, it is also longer lasting.

The placing of the outer electrode within close proximity of the ceramic tube removes the need for dimensional tolerances, thus reducing assembly times and cost. These generating cells can be easily designed to satisfy well-defined requirements.

Generally, the present invention provides ozone generating means, and the ozonizers containing these generating to be produced more cheaply and easier, and to be more robust, to last longer, and therefore require less servicing.

BRIEF DESCRIPTION OF THE DRAWINGS

The present invention will now be described with reference to the accompanying drawing, of which:

FIG. 2A is a schematic side view of a first embodiment of a generating cell in accordance with the invention;

FIG. 2B is a cross-section along the line IIB—IIB of FIG. 2A;

3

Figure 5:
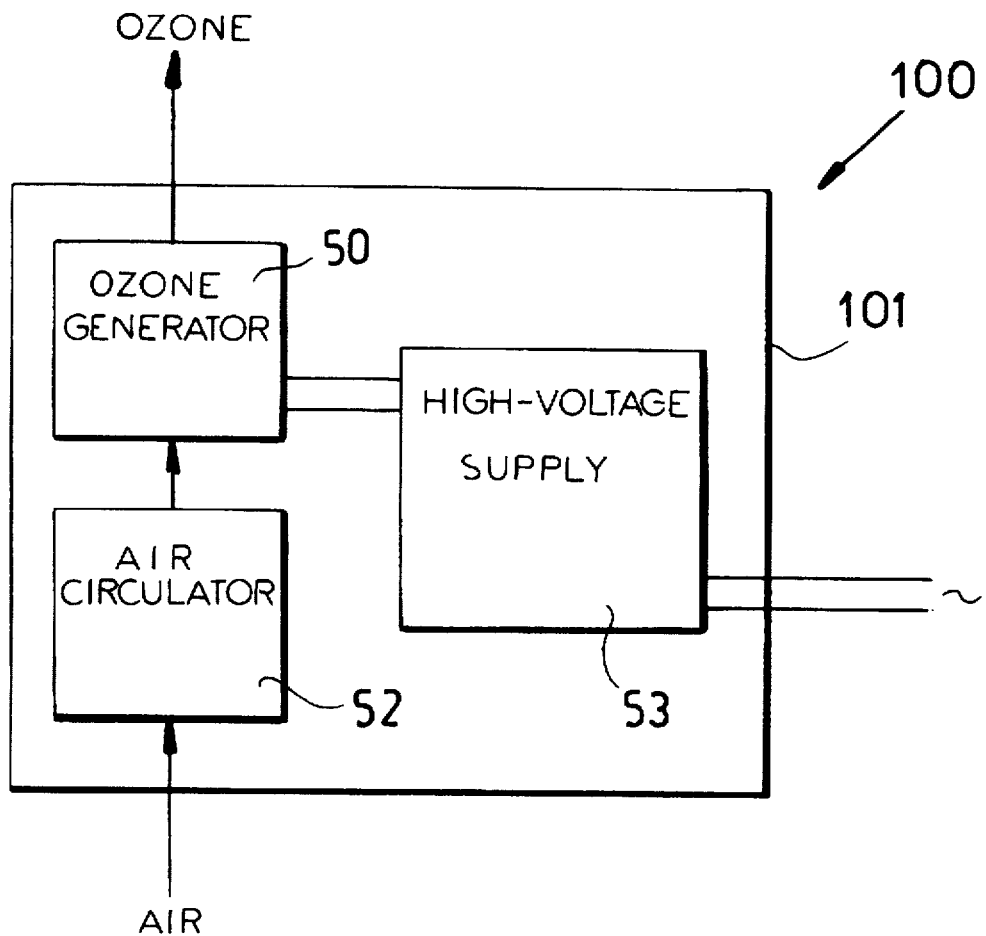
Figure 6:
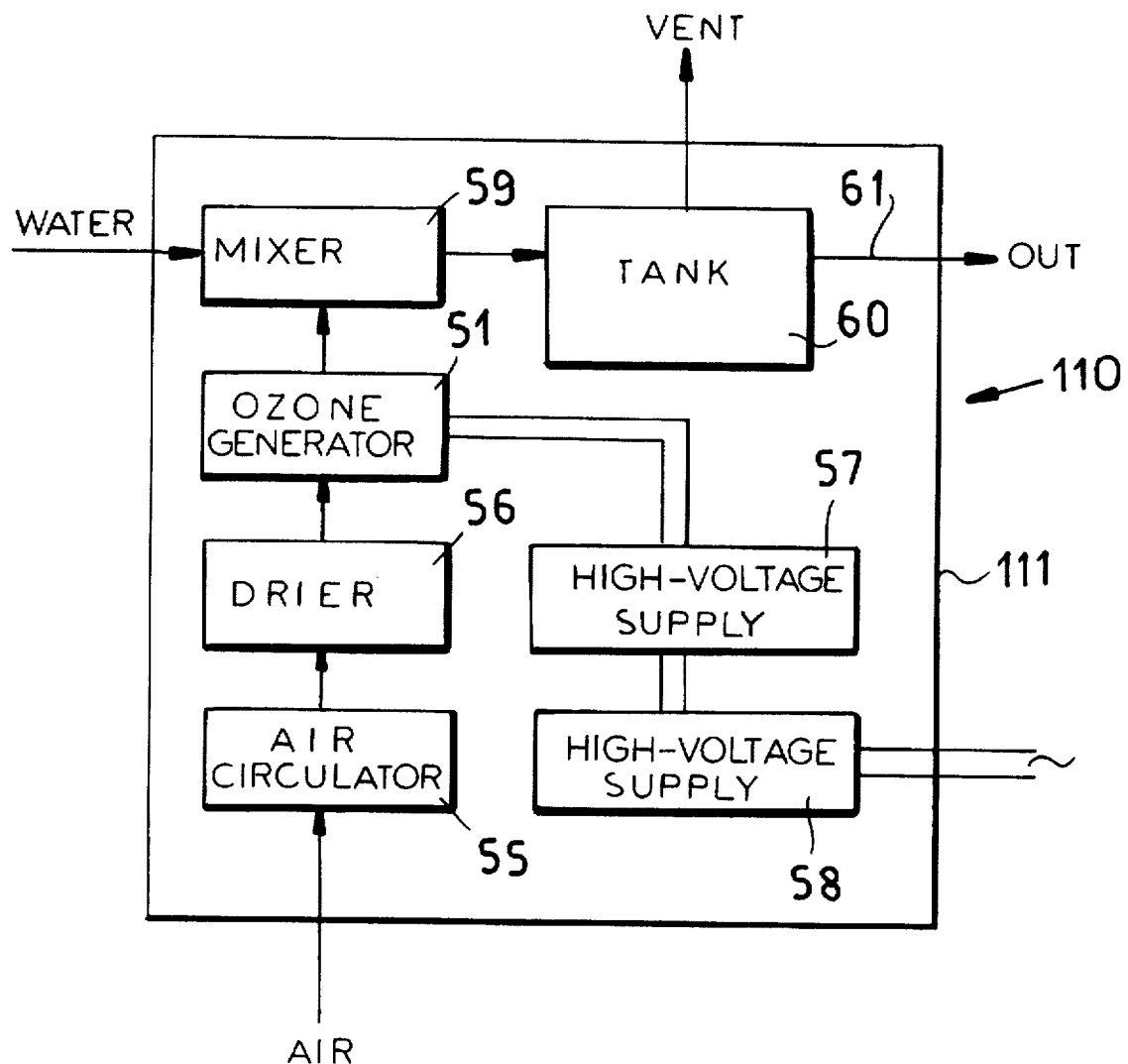

FIG. 5 is a block diagram illustrating an ozonizer for use in "dry" applications;

FIG. 6 is a block diagram illustrating an ozonizer for use in "wet" applications.

Figure 4:
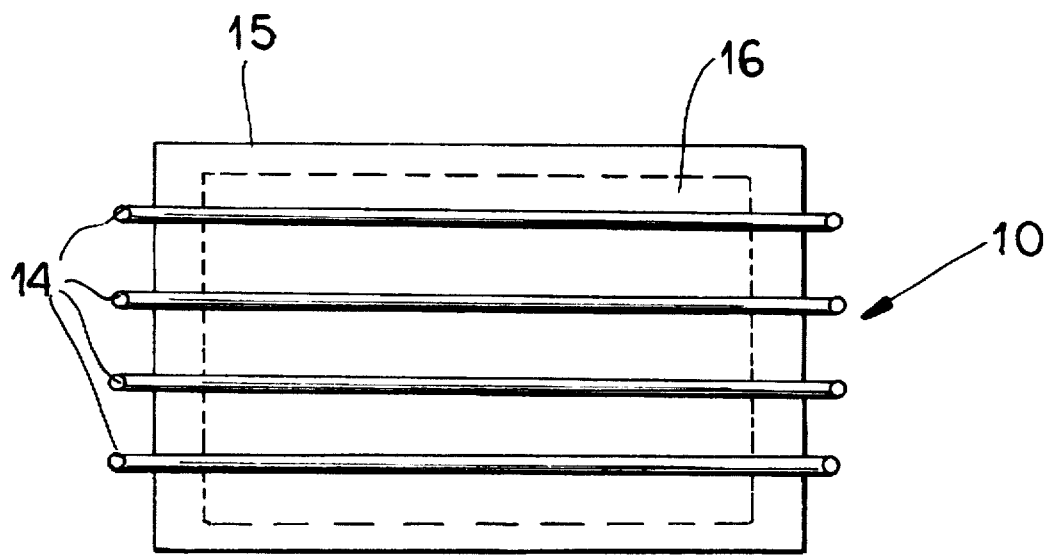
FIG. 4 is a schematic plan view of a third embodiment of an ozone generating cell in accordance with the invention.
Figure 7:
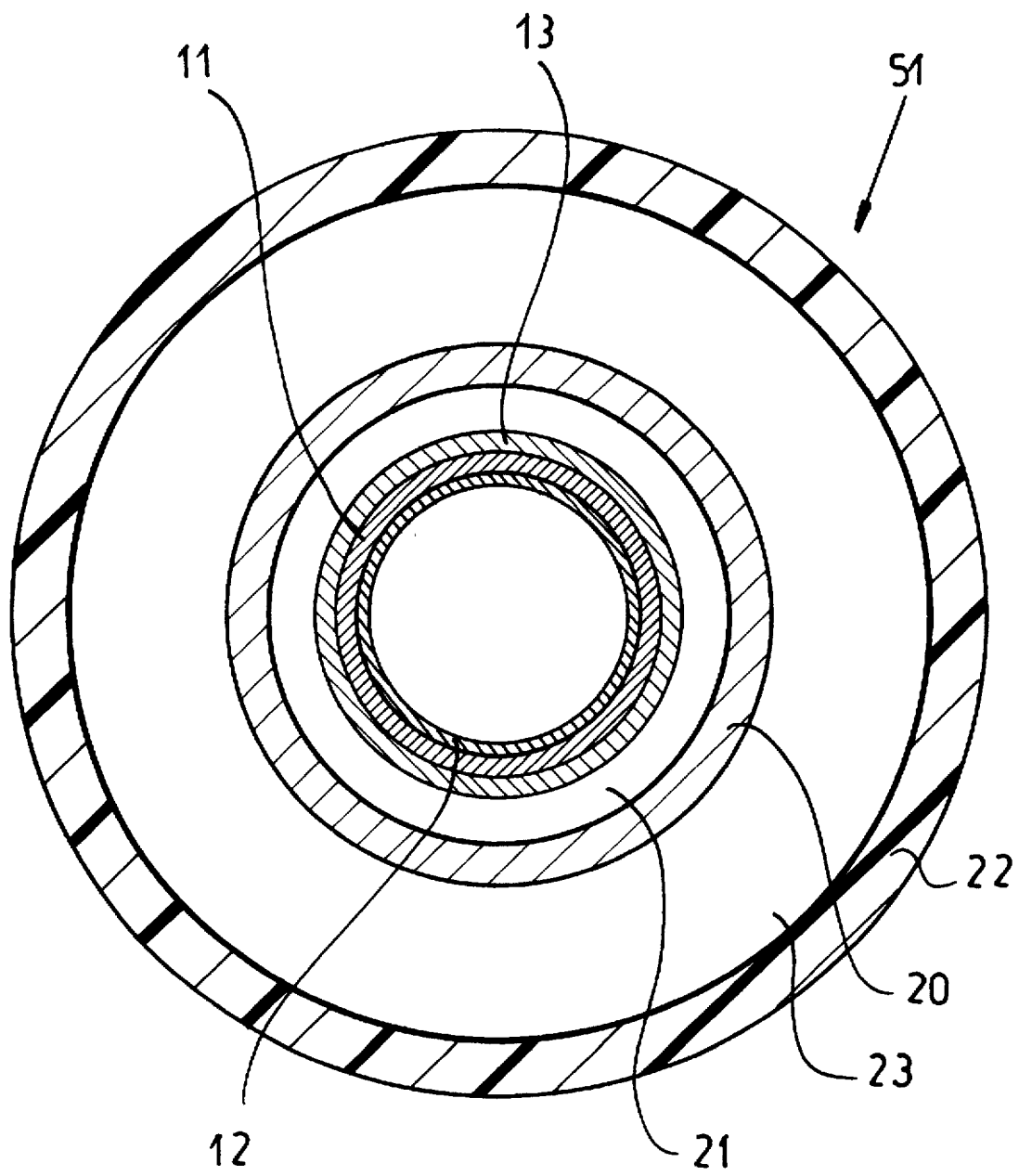
Figure 8:
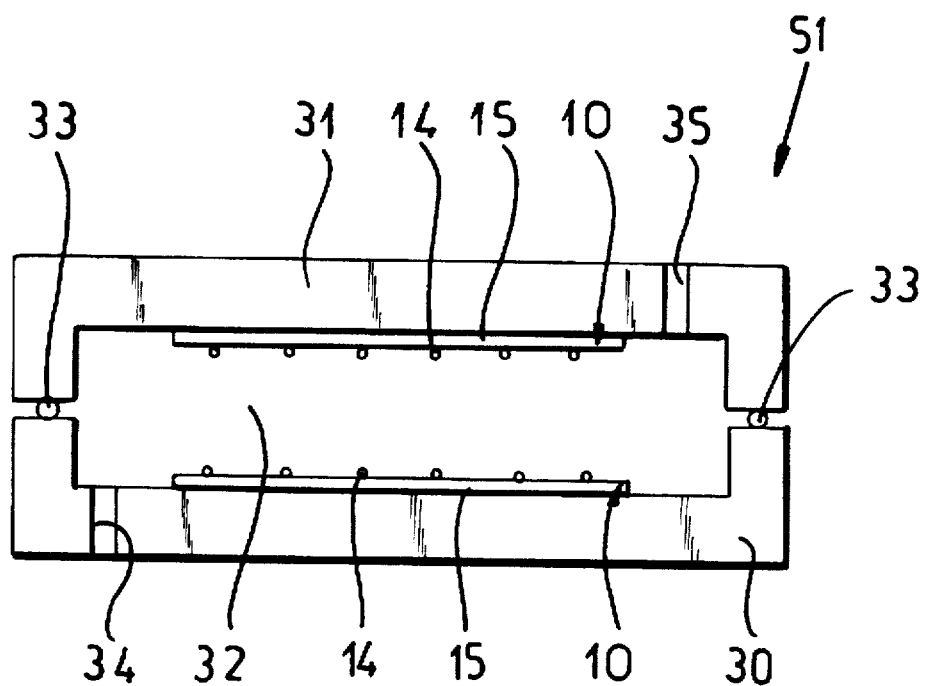

FIG. 7 is a schematic vertical cross-section illustrating an ozone generator comprising a cell illustrated in FIGS. 2A and 2B; and FIG. 8 is a schematic vertical cross-section illustrating an ozone generator comprising a cell illustrated in FIG. 4;

SPECIFIC DESCRIPTION

A generating cell 10 (FIGS. 2A and 2B) comprises a ceramic tube 11 coated internally with a metallic coating 12, typically of electroless nickel plate. Wound around the ceramic tube 11 is a helically wound metallic wire coil 13 in the form of a compression spring. The inner diameter of the spring 13 is slightly less than the outside diameter of the ceramic tube 11 to ensure a snug fit around the tube 11. The inner coating 12 forms the back electrode of the generating cell 10, and the wire of the compression spring 13 the front electrode. The ceramic tube 11 forms the dielectric between the two electrodes.

By providing the outer electrode in the form of a wire of circular cross-section, and, small radius of curvature, a corona discharge will result when a high-tension voltage supply is coupled across the inner and outer electrodes 12, 13, because, as is well known to persons skilled in the art, corona discharges result from points and edges.

Thus, when a voltage is applied across the electrodes and a corona discharge is produced, oxygen-containing gas, e.g. air, in the vicinity of the wire electrode i.e. the compression spring 13, is ionized to produce ozone from the oxygen molecules.

The compression spring 13 is a coil in which each turn is spaced apart from the adjacent turn. If the turns were to be too close to one another—effectively forming a metallic tube—then no corona discharge would be formed. The optimum separation is decided empirically depending on a number of factors, including, for example, the voltage and the cooling. Typically a separation of around 5 mm has been found to be the best, but separations of down to 64 microns have been achieved under certain conditions.

By providing the outer electrode in the form of a wire, the cross-sectional area of the front electrode is minimized thus maximizing the ozone output.

A ceramic tube of high density alumina 100 mm in length, with an outer diameter of 16 mm and 1 mm thick and having a compression spring of around 30 turns with an outer diameter of 15 mm and comprising a wire of 0.5 mm diameter will, with a suitable power supply and cooling, generate around 0.5 g of ozone per hour.

Figure 1:
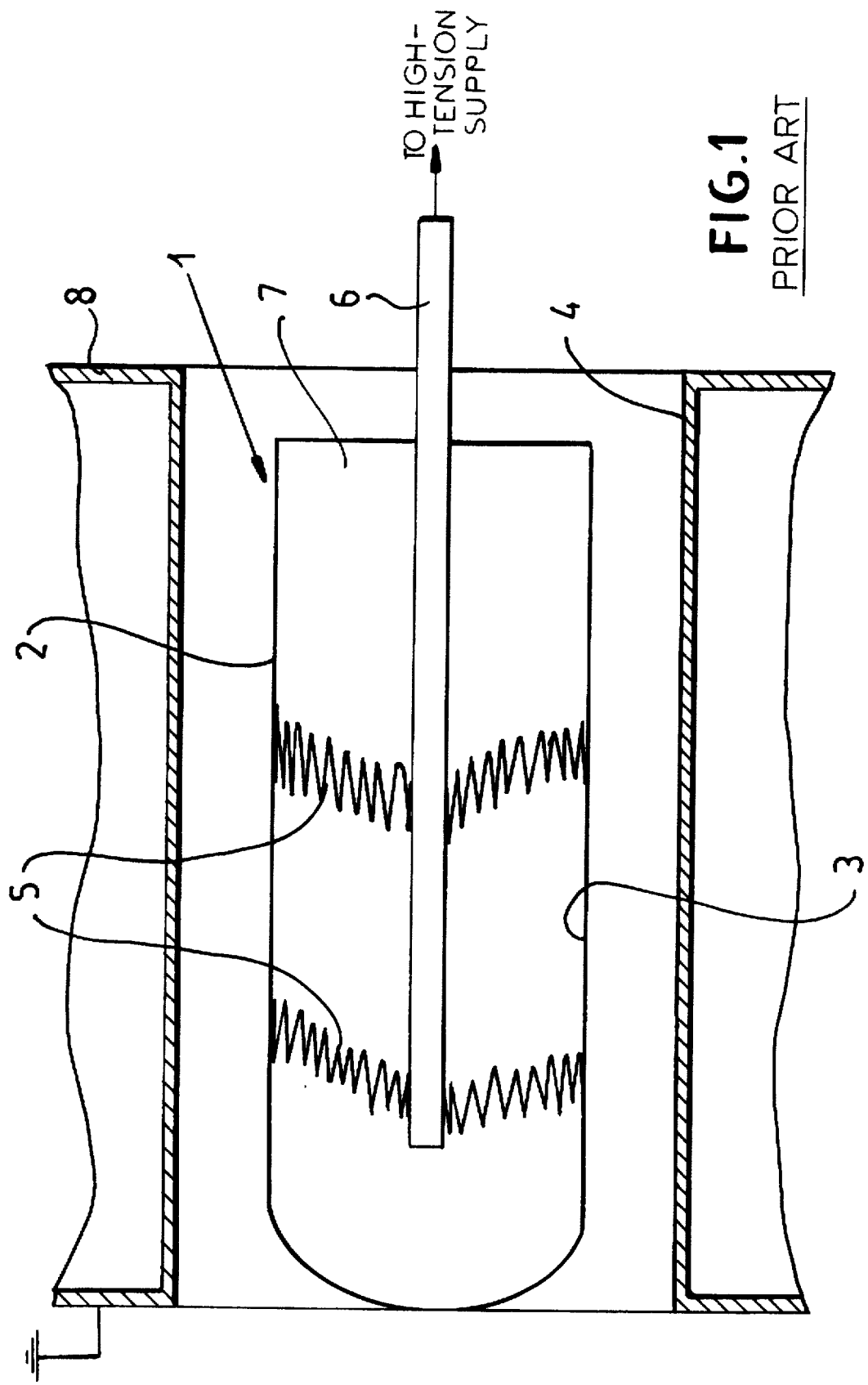
FIG. 1 is a schematic representation of an ozone generating cell of the prior art.
Figure 3:
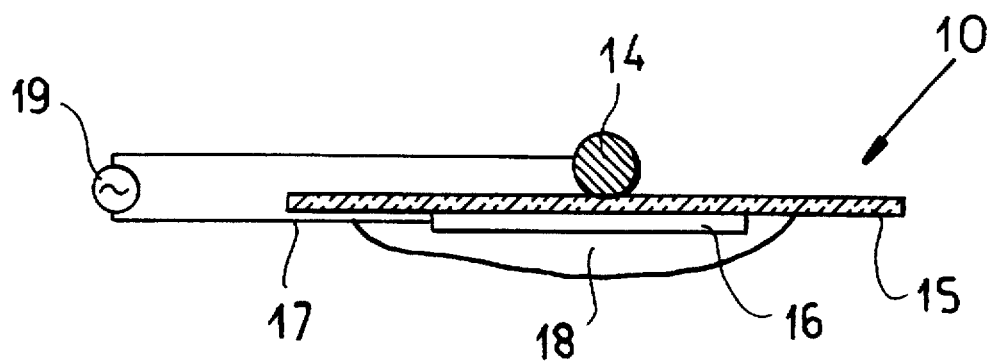
FIG. 3 is a schematic cross-section of a second embodiment of an ozone generating cell in accordance with the invention.

In a second embodiment of the generating cell 10, a wire 14, for example, of stainless steel, is stretched across a ceramic plate 15, for example of alumina. This forms the front electrode. The back electrode is provided by a metallic coating 16 on the reverse side of the plate 15. A high-tension voltage supply is coupled across the two electrodes 14, 16. A coupling wire 17 is soldered directly onto the coating 16. A silicon rubber resin 18 is provided to cover the coating 16. This is illustrated schematically in FIG. 3.

Again ozone is formed in the vicinity of the wire 14 when the high-tension voltage supply 19 is switched on. Using a high density 96% alumina plate with a coating of palladium in the form of a thick film applied by screen printing, with approximately 50 mm of the wire 14 across the back

4 electrode, and a suitable power supply, an ozone output of 50 mg per hour can be obtained.

Alternatively, more than one wire 14 can be stretched across the ceramic plate 15, as schematically illustrated in FIG. 4, which shows the wires 14, ceramic plate 15 and back electrode 16. For clarity, the resin 18 and the coupling to the power supply is not shown.

In this embodiment, each wire 14 is separated by a distance that will ensure a corona discharge is formed. As with the tubular embodiment described above, it is necessary that the wires is not too close that corona discharge will be formed. Again, this separation will be decided empirically, but 5 mm has typically been an optimum separation.

In the flat-plate embodiments described above the wire 14 has to be in close proximity to the ceramic plate 15 to ensure that a continuous curtain of discharge is produced, but this can be achieved without the wire being in contact with the ceramic plate 15. A typical gap has been found to be around 300 microns, although this will depend upon the voltage and frequency of the supply. This is also true of the of the first embodiment described above, but a snug fit of the spring 13 around the ceramic tube 11 is required to ensure that the spring does not move lengthways along the tube 11, but is held in place by friction. However, should part of the wire coil 13 be spaced away from the ceramic tube 11, then discharge will still occur. This has the advantage that production tolerances for the coil 13 are not critical.

As mentioned above, the formation of ozone is an endothermic reaction producing large quantities of heat, and, therefore, in the commercial production of ozone, some form of cooling is required.

As described in the preamble, ozone has a large number of uses in terms of its deodorizing and disinfecting properties.

Typically, these can be divided into two types of application—namely "wet" and "dry" applications. An example of a "dry" application is the production of gaseous ozone which can be used to destroy bacteria in the air and on surfaces. In "wet" applications, the ozone is dissolved in water to sterilize it, for example, in swimming pools.

FIG. 5 is a block diagram illustrating how an ozone generator is incorporated in an ozonizer unit 100 for "dry" applications.

The unit 100 comprises a housing 101. Inside the housing 101 is an ozone generator 50 arranged in its own housing. The generator 50 may use either the tubular or flat-plate generating cells 10 described above, and may incorporate a multiplicity of tubes or plates as required by the application. The generating cells 10 are typically mounted its own housing and coupled to a switch-mode power supply 53 and to an air-circulating system 52.

Air is fed into the housing 101 to the air-circulating system 52, which is uses a fan or a pump (not shown) to direct air to the generating cells 10. The front and back electrodes of the generating cells 10 are connected to the switch-mode power supply 53 which is used to provide the high-tension voltage—typically of 5 to 6 kV, and 50 kHz. The air from the air-circulating system 52 is used both as a source of oxygen molecules to produce the ozone, and for cooling. As described above, the ozone is produced in the vicinity of the wires by ionization in the corona discharge.

The actual design of the different components of these units will depend upon the particular application. All incorporate the generating cells of the type in accordance with the present invention. The power supplies and pumps are typically of the types already known by persons skilled in the art, but may be designed particularly for the application as is possible by persons skilled in the art. An advantage of these ozone generators is that they lend themselves particularly well to specific applications.

FIG. 6 is a block diagram illustrating how an ozone generator is incorporated in an ozonizer unit 110 for "wet" applications.

The unit 110 comprises a housing 111. Inside the housing 111 is an ozone generator 51, which may use either tubular or flat-plate generating cells 10, and are described in more detail below. Air is fed into the housing 111 to a compressor 55, which compresses the air to a pressure of around one bar. This high pressure is needed because, ultimately, the ozone produced has to be injected into water. From the compressor 55, air is fed to a dryer 56, to remove moisture—which may cause nitric acid to be produced during the generating reaction by fixing nitrogen from the air.

The dried and compressed air is then fed into the ozone generator 51 where the ozone is generated by ionization as described above. Power for the ozone generator 51 is supplied by a switch-mode power supply 57, controlled by a control circuit 58.

The ozone produced by the ozone generator 51, is fed to a mixer 59, in the form of an injector or bubbler, in which the ozone is dissolved in water, supplied to the mixer 59 from a water supply (not shown) through the housing 111, to form a saturated solution. The saturated solution is held in the mixer 59 for some time to allow the ozone to react with the water, typically around four minutes. The ozonized water is then fed to a residence tank 60, where the treated, ozonized water is kept until required, at which point it is discharged through an outlet 61. The residence tank 60 is vented to remove the remaining fraction of air.

Again, the actual design of the different components of these units will depend upon the particular application, and incorporate the generating cells of the type in accordance with the present invention. The different components, e.g. mixer and power supply, are typically of the types already known by persons skilled in the art, but may be designed particularly for the application as is possible to persons skilled in the art. As has already been said, an advantage of these ozone generators is that they lend themselves particularly well to specific applications.

FIGS. 7 and 8 illustrate ozone generators used in "wet" applications.

An ozone generator 51 comprising a tubular type generating cell 10 as in FIGS. 2A and 2B is illustrated in FIG. 7. The generating cell 10 comprising the ceramic tube 11 and the coil 13 is substantially concentrically mounted within a stainless steel tube 20 with a gap 21 between the generating cell 10 and the inner surface of the stainless steel tube 20. Air is blown through this gap 21 during the ozone producing process, where it is ionised by the production of a corona discharge around the wire 13 thereby producing ozone. Around the stainless steel tube 20 is substantially concentrically arranged a rigid plastic housing 22 defining a second gap 23 through which water is pumped to provide the cooling required during the ozone producing process. The amount of ozone produced as well as being dependant on the voltage and frequency of the high tension supply is also dependant on the amount of cooling and the rate at which the air is blown along the second gap 23.

The wire and ceramic tube are maintained at ground potential, but for clarity the electrically connection have not been shown.

An ozone generator 51 incorporating a flatplate type of cell 10 as in FIG. 4, is illustrated in FIG. 8.

Here, two flat-plate generating cells 10 are each mounted on substantially U-shaped backing plates 30, 31 made of aluminium. The backing plates 30, 31 are placed together to define an internal cavity 32, in which the two generating cells 10 are located. An O-ring seal 33 is provided between the two backing plates 30, 31 to ensure an air tight seal around the cavity 32. Apertures 34, 35 in the two backing plates 30, 31 are provided as an air inlet and ozone outlet respectively. Air is fed in through the inlet 34, over the generating cells 10, where it is ionized in the corona discharge around the wires 14, and ozone is then fed through the outlet 35. The backing plates 30, 31 are cooled using water—or air—to provide the cooling. The ceramic plates 15 and the backing plates 30,31 are maintained at ground potential. For clarity, the switch-mode power supply is not shown.

It will be understood to a person skilled in the art, that various modifications are possible within the scope of the present invention, for example, the wires may be of any conducting material provided it can be produced in fine cross-section. Examples include stainless steel, the noble metals and titanium. Preferably, it should be able to withstand corrosion.

It is possible to use other ceramics for the dielectric tube and plate, for example, MgO, stabilized zirconia, $TiO_2$.

Ceramics which have a tendency to break down electrically are not really suitable.

For the back electrode, thick films (conducting inks) and electro-less plate are suitable. Other suitable coatings include films deposited by evaporation and sputtering.

The dimensions of the tubes, ceramic plates and wire front electrodes can be selected depending upon the application, requirements and operating parameters. Often, the limits are set by manufacturing and production criteria. Ceramic tubes of between 4 mm and 16 mm outside diameter have been successfully used. Ceramic plates of 100 mm square have been used.

I claim:

1. An ozone generator for generating ozone from an oxygen-containing gas, the ozone generator comprising:
    a flat dielectric plate having first and second faces;
    at least one first electrode in the form of a straight length of wire running across the first face wherein said at least one first electrode is parallel to any other first electrode;
    a second electrode in the form of a metallic coating covering a substantial portion of the second face;
    wherein said at least one first electrode is in contact with said dielectric plate; and
    means for coupling a high-tension voltage between the first electrode and the second electrode to produce a corona discharge in a vicinity of the first electrode, thereby forming ozone from oxygen in the oxygen-containing gas.

2. An ozone generator according to claim 1 wherein the second electrode is covered by a protective coating.

3. An ozone generator according to claim 2 wherein the protective coating is a silicone rubber resin.

4. An ozone generator according to claim 1 wherein the second electrode is a screen-printed thick film.

5. An ozone generator according to claim 1 wherein the dielectric plate is a ceramic plate.

6. An ozone generator according to claim 5 wherein the ceramic is high density 96% alumina.

7. An ozone generator according to claim 1 comprising a plurality of first electrodes, each of a plurality of first electrodes being in the form of a respective straight piece of wire running substantially parallel to others of said pieces of wire across the first face.

8. An ozone generator according to claim 7 wherein the first electrodes are separated by gaps of approximately 5 mm.

* * * * *